Sept. 3, 1929.  G. H. FLETCHER ET AL  1,727,055
RESILIENT SHAFT COUPLING
Filed Sept. 19, 1928  4 Sheets-Sheet 1

INVENTORS
George H. Fletcher
& Hermann Rusby
BY
ATTORNEY

Sept. 3, 1929.   G. H. FLETCHER ET AL   1,727,055
RESILIENT SHAFT COUPLING
Filed Sept. 19, 1928   4 Sheets-Sheet 2
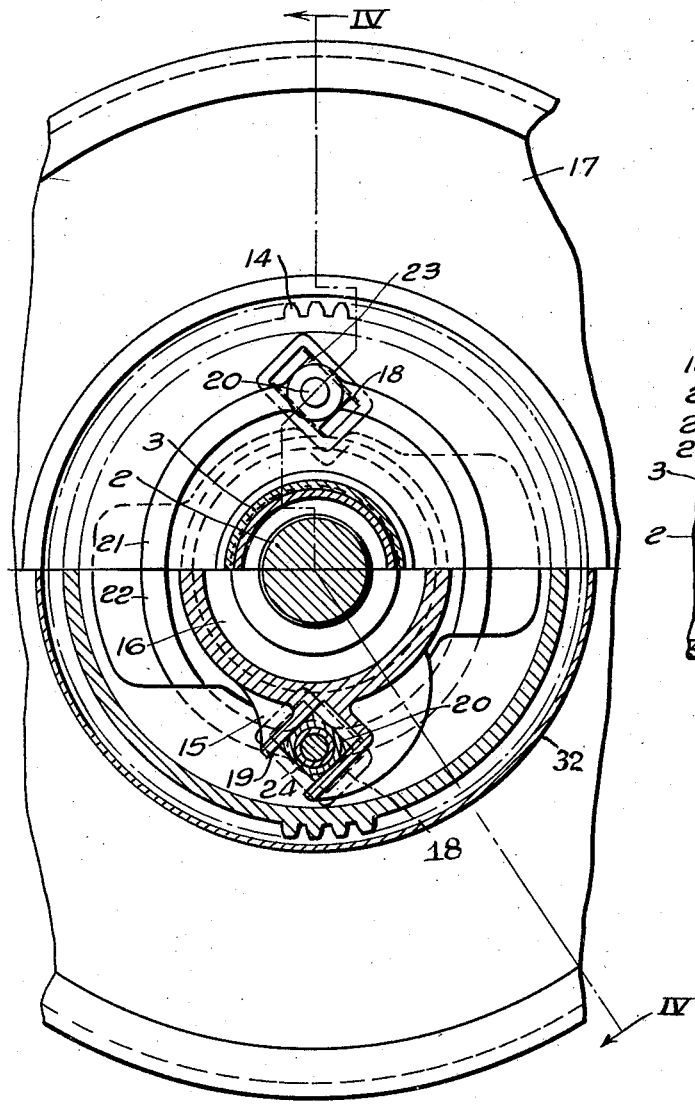
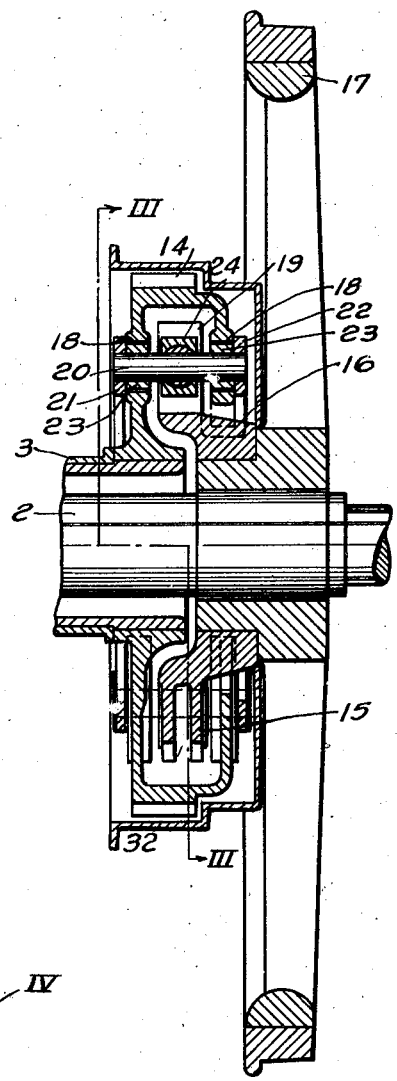
INVENTORS.
George H. Fletcher
& Hermann Rusby.
BY
ATTORNEY Sept. 3, 1929.   G. H. FLETCHER ET AL   1,727,055
RESILIENT SHAFT COUPLING
Filed Sept. 19, 1928    4 Sheets-Sheet 3

INVENTORS,
George H. Fletcher
& Hermann Rusby.
BY
ATTORNEY

Sept. 3, 1929.  G. H. FLETCHER ET AL  1,727,055
RESILIENT SHAFT COUPLING
Filed Sept. 19, 1928    4 Sheets-Sheet 4

INVENTORS.
George H. Fletcher
& Hermann Rusby.
BY
Wesley S. Carr
ATTORNEY

Patented Sept. 3, 1929.

1,727,055

UNITED STATES PATENT OFFICE.

GEORGE HERBERT FLETCHER, OF SHEFFIELD, AND HERMANN RUSBY, OF STOCKS-BRIDGE, NEAR SHEFFIELD, ENGLAND, ASSIGNORS TO WESTINGHOUSE ELECTRIC AND MANUFACTURING COMPANY, A CORPORATION OF PENNSYLVANIA.

RESILIENT SHAFT COUPLING.

Application filed September 19, 1928, Serial No. 306,808, and in Great Britain September 8, 1927.

Our invention relates to resilient couplings for rotary members that are normally in substantially coaxial relation in which provision has been made for relative lateral displacement of the rotary members in directions perpendicular to the axis of rotation.

An object of our invention is to provide an improved coupling which shall be particularly adapted for the transmission of the torque of a driving motor to the track wheels of a locomotive.

Another object of our invention is to provide a coupling mechanism that shall be adapted to permit some degree of relative longitudinal movement and relative tilting movement of the coupled members, as well as relative lateral displacement thereof.

In accordance with our invention, the improved resilient coupling device comprises, in general, a resilient floating member, at least two portions of which move along guides, or the like, associated with each of the members to be coupled, the guides on each member being parallel to each other and inclined to those on the other member.

By means of the sliding connection between the guides and the floating member, the two coupled members are enabled to move laterally with respect to each other without distorting the resilient member. However, upon the application of torque tending to rotate one of the coupled members with respect to the other by reason of the inclination of the guides on the one member to the guides on the other member, the resulting action tends to move the parts of the resilient member in such manner as to alter the distance between them. Torque is thus resiliently transmitted between the members by virtue of the distortion of the resilient member when such motion of its guided parts takes place. Misalinement between the axes of the coupled members is permitted by reason of the provision of slidably mounted spherical joints between the resilient member and the members to be coupled.

The foregoing and other objects of our invention may be readily appreciated upon studying the following description in connection with the accompanying drawing, which shows resilient couplings embodying the invention, applied, by way of illustration, to connect a locomotive track wheel and a driving or quill gear and in which:

Fig. 3 is a view, in cross-section, of a modified form of locomotive drive mechanism, taken along the line III—III of Fig. 4;

Fig. 4 is a view, in section, of the modified locomotive drive mechanism, taken along the line IV—IV of Fig. 3;

Figure 1:
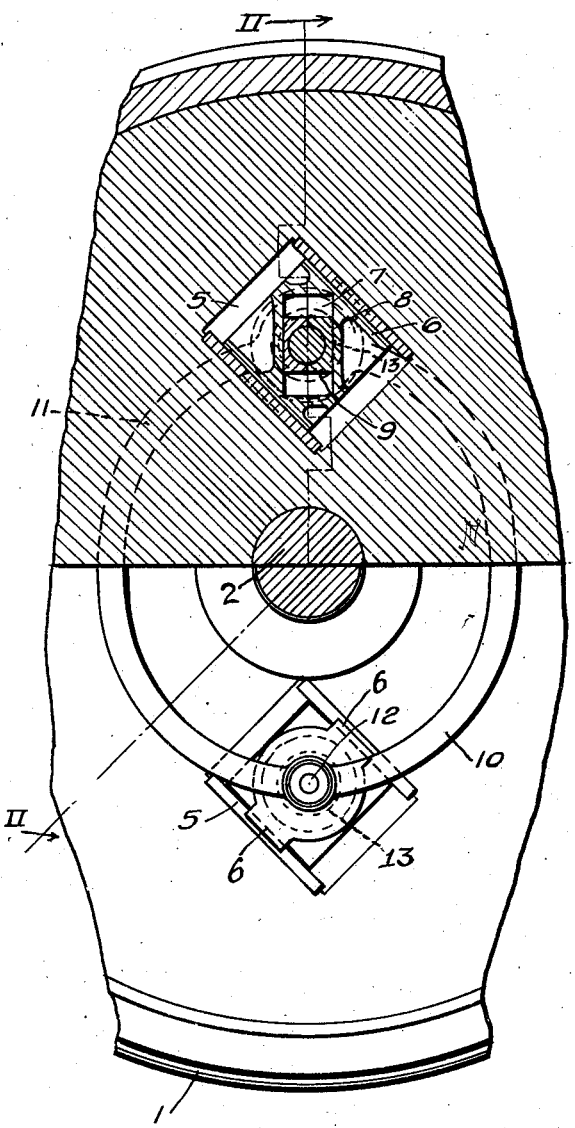
Figure 1 is a view, partially in side elevation and partially in section, taken along the line I—I of Fig. 2, of a portion of a locomotive track wheel to which is applied one construction of the coupling device embodying our invention.
Figure 2:
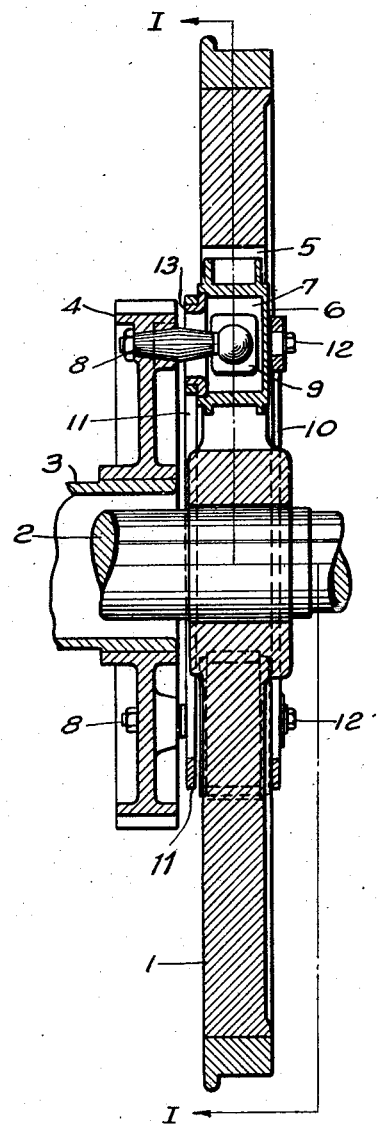
Fig. 2 is a view, in section, of the locomotive driving mechanism, taken along the line II—II of Fig. 1.

Referring now to the particular embodiment of the invention shown in Figs. 1 and 2, the locomotive drive mechanism there shown comprises, in general, a track wheel 1 that is mounted upon a driving axle 2 in the usual manner and constitutes one of the members to be coupled. The other member to be coupled comprises a hollow quill shaft 3 that is disposed to surround the driving axle 2 and carries a gear wheel 4 that may be connected, in any suitable manner, to a driving motor (not shown).

For the purpose of receiving a coupling element, the wheel 1 is provided, at diametrically opposite positions, with two slots 5 that are disposed parallel to each other. In each of the slots 5 is slidably mounted a sliding block or shoe 6 which is provided with a slot 7. The slots 7 in the blocks 6, in this case, are disposed in alinement with each other and, consequently, are similarly inclined with respect to the slots 5 in the track wheel 1.

For the purpose of transmitting torque from the gear wheel 4 to the track wheel 1, the gear wheel 4 is provided, at diametrically opposite points, with two pins 8 which extend into the slots in the sliding blocks 6 and are guided therein by means of sliding shoes 9 which are carried on the ends of the pins 8 by means of a spherical seat or ball joint.

In order to maintain the sliding blocks 6 in their normal operating positions, annular members 10 and 11 of spring steel or other suitable material are connected to them on the respective sides of the track wheel 1. As shown, the member 10 is attached to the blocks 6 by means of pins 12, and the member 11 is supported upon collar portions 13 secured to the opposite faces of the blocks 6. The sliding shoes 9 are disposed within the slots 7 in such manner as to be capable of limited transverse sliding movement, as well as longitudinal movement, relative to the sliding block 6.

By reason of this construction, the gear wheel 4 and the track wheel 1 are free to move laterally with respect to each other, such movement merely resulting in an equal sliding movement in the same direction of the two blocks 6 within the slots 5 and by movement of the shoes 9 relative to the slots 7. Inasmuch as the two blocks 6 move in the same direction and the same distance, it may be seen that the flexible members 10 and 11 are not deformed when lateral relative motion takes place between the gear wheel 4 and the track wheel 1.

Longitudinal movement between the gear wheel 4 and the track wheel 1 is readily taken care of by virtue of the limited transverse sliding movement of which the shoes 9 are capable with respect to the slots 7. Further, tilting motion or misalinement between the wheel axle 2 and the quill shaft 3 is permitted by reason of the spherical connection between the pins 8 and the sliding shoes 9.

It will, therefore, be readily seen that, by means of a combination of the universal motion permitted by the spherical connection on the ends of the pins 8, together with the sliding motion of the sliding shoes 9 and the sliding blocks 6, any combination of lateral displacement, longitudinal displacement or misalinement between the axle 2 and quill shaft 3 may be permitted to a limited degree.

However, when torque is exerted tending to rotate the gear wheel 4 relative to the track wheel 1, the forces which are transmitted through the sliding blocks 6 tend to move the blocks in such manner as to either increase or decrease the distance between them by reason of the inclination of the slots 5 to the slots 7. For example, if the gear wheel 4 exerts a torque clockwise upon the track wheel 1, as shown in Fig. 1, the blocks 6 will tend to be forced towards the center of the track wheel by reason of the radial component of the reactive force exerted upon them by the slots 5.

It is, therefore, apparent that, when torque is being transmitted, the resilient elements 10 and 11 will be distorted in proportion to the torque and will permit angular displacement between the gear wheel 4 and the track wheel 1 in order to cushion the changes in angular velocities which may occur by reason of operating over irregularities in the track or from other causes.

As shown in Figs. 1 and 2, the slots 5 are disposed at approximately 45° to a diameter of the track wheel 1 and the slots 7 are inclined at 45° to the slots 5 and disposed parallel to a diameter of the track wheel. However, it will be evident that, so long as the slots 7 are disposed parallel to each other and are equally inclined to the slots 5, which are also disposed parallel to each other, other inclinations of the slots may be chosen without changing, in any way, the action of the coupling, as described hereinbefore.

In the modification of the coupling device that is illustrated in Figs. 3 and 4, the blocks 6 shown in Figs. 1 and 2 have been dispensed with, and the slots constituting the guides are formed directly in the gear wheel and in a portion of the track wheel, respectively. As shown in Fig. 4, the quill shaft 3 is provided with a gear wheel 14 that resembles a box and is disposed to receive laterally extending web portions 15 of a flanged member 16 which is rigidly mounted on the hub of a track wheel 17.

In order that it may constitute a part of the coupling device, the gear wheel 14 is formed with diametrically opposed parallel slots 18, and the web portion 15 of the flanged member 16 is similarly provided with corresponding parallel slots 19 which are disposed at an angle to the slots 18 of the gear wheel 14. For connecting the gear wheel 14 to the flanged member 16, pins 20, which are secured at diametrically opposite points of annular spring members 21 and 22, are disposed to pass through the slots 18 and 19 and are guided therein by means of rectangular shoes 23 and 24, respectively.

To provide for misalinement between the quill shaft 3 and the axle 2, the pins 20 are spherically seated within the shoes 24 which are also free to move transversely within the slots 19, as well as laterally. A suitable protective casing member 32 may be utilized to enclose the mechanical parts of the coupling.

In this modification of the drive mechanism, the slots 18 and 19 are disposed at right angles to each other and at 45° to a common diameter of the track wheel and gear wheel. In operation, this device functions substantially like the structure shown in Figs. 1 and 2.

Figure 5:
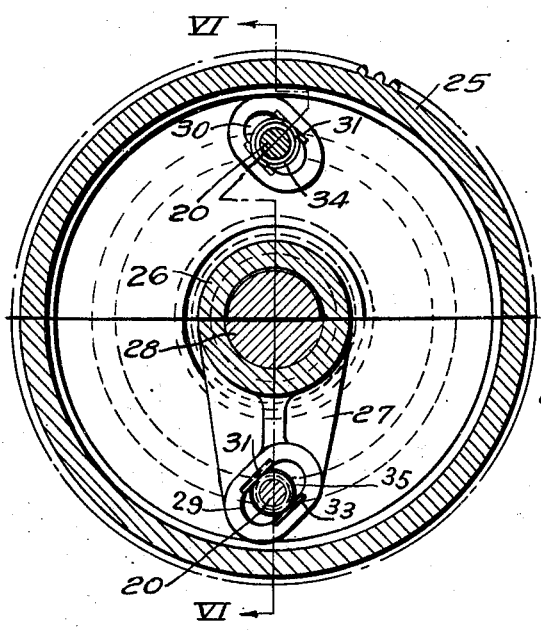
Fig. 5 is a view, in section, of another modification of the drive mechanism, taken along the line V—V of Fig. 6.
Figure 6:
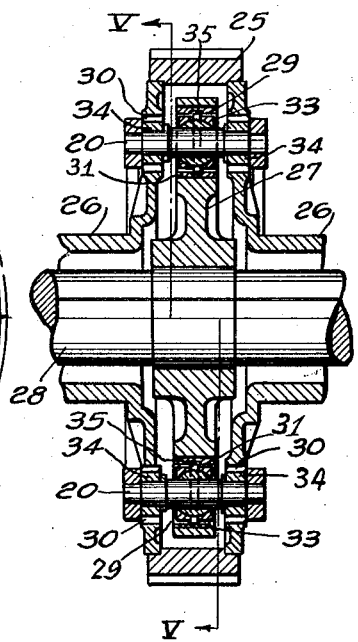
Fig. 6 is a view, in section, taken along the line VI—VI of Fig. 5.

As shown in Figs. 5 and 6, it is not essential that shoes having flat sliding surfaces be utilized. In this modification of the invention, a gear wheel 25, similar to the gear wheel 14 shown in Figs. 3 and 4, is carried by flanges which are integral with two sleeve portions 26 which enclose cranks 27 that are secured upon a wheel axle 28. The cranks 27 are provided with slots 29 at their ends, and the gear wheel 25 is provided with mating slots 30 which correspond, in general, to the slots 19 and 18 in the flanged member 16 and the gear wheel 14, respectively, shown in Fig. 4. The operating surfaces of the slots 29 and 30 are provided with renewable linings 31 of suitable bearing metal to coact with rollers 33 and 34, respectively, which are mounted upon pins 20 and are equivalent to the shoes 23 and 24 employed in the structure shown in Figs. 3 and 4. The roller 33 is spherically seated on the pin 20 and is prevented from moving laterally within the slot 29 by means of a flange 35 which engages a coresponding groove in the lining 31 of the slot 29. The spherical seating portion of the roller 33 is preferably axially slidable on the pin 20 in order to permit longitudinal motion of the axle shaft 28 relative to the sleeves 26.

In operation, this coupling is substantially the same as the coupling shown in Figs. 3 and 4 but, by virtue of the roller-bearing means, the frictional resistance between the parts of the coupling will be somewhat less.

Figure 7:
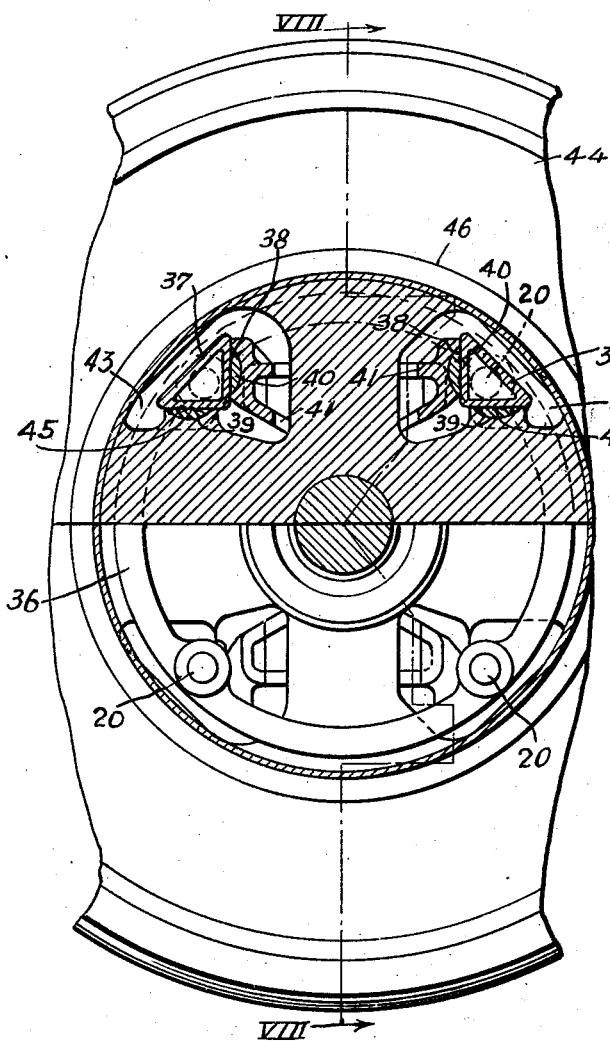
Fig. 7 is a view, partially in side elevation and partially in section, taken along the line VII—VII of Fig. 8, of a further modification of the locomotive drive mechanism.
Figure 8:
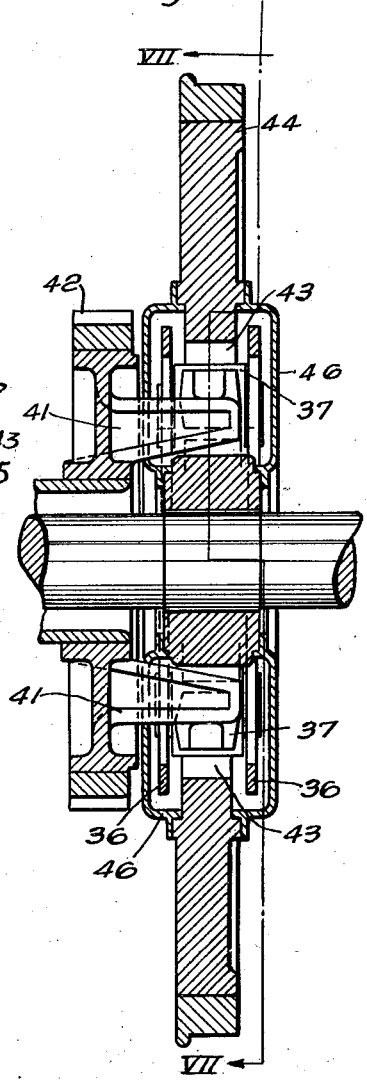
Fig. 8 is a view, in section, of the drive mechanism, taken along the line VIII—VIII of Fig. 7.

In order that the resilient members through which torque is transmitted between the coupled members may be associated with the latter in more than two places, a construction such as shown in Figs. 7 and 8 may be utilized. In this modification of the invention, annular spring members 36 are pivotally secured, by means of pins 20, to four equally spaced slide blocks 37, each having two operating faces 38 and 39 disposed at right angles to each other. The parallel operating faces 38 of the blocks 37 are adapted to cooperate with bearing pads 40 which are carried on the ends of suitably shaped arms 41 which are integral with a gear wheel 42.

The arms 41 extend into recesses 43 in a track wheel 44 which are provided with bearing pads 45 for cooperating with parallel surfaces 39 on the slide blocks 37. The bearing pads 40 and 45 are cylindrically or spherically seated in the arms 41 and the track wheel 44 in such manner as to permit limited misalinement between the axes of the gear wheel 42 and the track wheel 44.

Further, the bearing surfaces of the pads 40 and 45 are so disposed relative to the blocks 37 that limited relative motion between the gear wheel 42 and the track wheel 44 is permitted in a direction parallel to the axis of the track wheel. Detachable covers 46 are provided on the track wheel for the purpose of protecting the mechanical parts of the coupling against the entry of foreign matter. The particular arrangement of the coupling device shown in these figures permits torque to be resiliently transmitted in either direction between the gear wheel 42 and the track wheel 44 and relative movement of the parts in planes passing through the axis of the track wheel in substantially the same manner as described in connection with Figs. 1 to 6.

Although we have described several embodiments of our invention, it will be apparent to those skilled in the art that various further modifications may be made in the details of the coupling device and in the general arrangement of the various parts without departing from the spirit and scope of the invention, as defined in the appended claims.

We claim as our invention:

1. A coupling device for shafts comprising a driving member, a driven member, two parallel guiding surfaces on the driving member, cooperating guiding surfaces on the driven member and a resilient intermediate member having portions in engagement with the guiding faces on the driving member and on the driven member for transmitting torque.

2. A coupling device for shafts comprising a driving member, a driven member, two parallel guiding surfaces on the driving member, cooperating guiding surfaces on the driven member and a resilient intermediate member having portions in engagement with the guiding surfaces on the driving member and on the driven member for transmitting torque, the guiding surfaces on the driven member being parallel to each other and disposed at an angle to the surfaces on the driving member.

3. In a coupling device, in combination, a plurality of rotatable members to be coupled, a plurality of guiding portions associated with each of the members to be coupled, said guiding portions associated with each of said members being parallel to each other and inclined to those of the other coupled members, and a resilient floating member for transmitting torque, said floating member having a plurality of portions guided along the guiding portions associated with the members to be coupled.

4. In a coupling device, in combination, a plurality of members to be coupled, each of the members to be coupled having guide portions associated therewith, the guide surfaces associated with one of said members being parallel to each other and inclined to those of the other member which are also parallel to each other, and a resilient floating member having a plurality of portions which are guided by the guide surfaces associated with the members to be coupled.

5. In a coupling device, in combination, a plurality of members to be coupled, each of the members to be coupled having guide portions associated therewith, the guide surfaces associated with one of said members being parallel to each other and inclined to those of the other member which are also parallel to each other and a resilient floating member having a plurality of intermediate members comprising slide blocks disposed to slide on the guide surfaces of one of the members to be coupled, said slide blocks also being provided with guide surfaces for the other member to be coupled.

6. In a coupling device, in combination, a plurality of members to be coupled, each of the members to be coupled having guide surfaces associated therewith, the guide surfaces associated with one of said members being parallel to each other and inclined to those of the other member which are also parallel to each other and a resilient floating member having intermediary anti-frictional bearing means adapted to run upon the guide surfaces associated with the members to be coupled.

7. In a coupling device, in combination, a plurality of members to be coupled, each of the members to be coupled having guide surfaces associated therewith, the guide surfaces associated with one of said members being parallel to each other and inclined to those of the other member which are also parallel to each other and a resilient floating member having connected thereto a plurality of similar slide blocks each having two slide surfaces disposed at an angle for engaging the guide surfaces associated with the member to be coupled.

8. A coupling device for shafts comprising a driving member, a driven member, a plurality of guides associated with the driving and the driven members, and a resilient floating member, said floating member having a plurality of portions guided along the guide associated with the members to be coupled.

9. A coupling device for shafts comprising a driving member, a driven member, a plurality of guides associated with the driving and the driven members, and a resilient floating member, said floating member having a plurality of portions guided along the guides associated with each of said members being parallel to each other and inclined to those of the other coupled member.

10. A coupling device for shafts comprising a driving member, two diametrically oppositely disposed guiding surfaces on the driving member, said surfaces being disposed in parallel planes that are parallel to the axis of the driving member, a driven member having corresponding guiding surfaces disposed at an angle to the surfaces on the driving member, bearing members disposed to engage corresponding guiding surfaces on the driving and the driven members and resilient means for connecting the bearing members in such manner that the distance between the bearing members may be changed when torque is transmitted by deflecting the resilient connecting means by reason of the angular relation of the guiding surfaces on the driving and the driven members.

11. A locomotive drive mechanism comprising a track wheel having a plurality of bearing surfaces disposed in planes parallel to the wheel axis and parallel to each other, a driving member having corresponding plane bearing surfaces disposed parallel to the axis of the driving member and to each other but at an angle to the bearing surfaces in the track wheel, and an intermediate resilient member having bearing portions in engagement with the bearing surfaces in the track wheel and in the driving member, said resilient member being so disposed relative to the driving member and the track wheel that it will be deflected when torque is transmitted therebetween.

In testimony whereof, we have hereunto subscribed our names this 3rd day of September, 1928.

GEORGE HERBERT FLETCHER.
HERMANN RUSBY.